United States Patent [19]
Kokinda

[11] Patent Number: 5,303,606
[45] Date of Patent: Apr. 19, 1994

[54] ANTI-BACKLASH NUT HAVING A FREE FLOATING INSERT FOR APPLYING AN AXIAL FORCE TO A LEAD SCREW

[76] Inventor: Mark A. Kokinda, 11 Hidden Creek Cir., Pittsford, N.Y. 14534

[21] Appl. No.: 48,354

[22] Filed: Apr. 15, 1993

[51] Int. Cl.⁵ .................... F16H 57/12; F16H 25/24
[52] U.S. Cl. ........................... 74/441; 411/304; 411/433
[58] Field of Search ............... 74/441; 411/304, 433, 411/434

[56] References Cited

U.S. PATENT DOCUMENTS

| Re. 32,433 | 6/1987 | Erikson | 74/441 |
| 2,586,044 | 2/1952 | Horsky | 74/441 |
| 2,615,348 | 10/1952 | Gasser | 74/441 |
| 3,760,686 | 9/1973 | Goodwin | 74/441 X |
| 3,831,460 | 8/1974 | Linley, Jr. | 74/441 X |
| 4,249,426 | 2/1981 | Erikson et al. | 74/441 X |
| 4,449,417 | 5/1984 | Sasaki | 74/441 X |
| 4,645,395 | 2/1987 | Lundgren | 411/304 X |
| 5,117,706 | 6/1992 | Kempe | 74/441 |

FOREIGN PATENT DOCUMENTS

| 57-110851 | 7/1982 | Japan | 74/441 |
| 57-179463 | 11/1982 | Japan | 74/441 |
| 1-153861 | 6/1989 | Japan | 74/441 |
| 1610152 | 11/1990 | U.S.S.R. | 74/441 |

OTHER PUBLICATIONS

Anti-Backlash Nut Show Management and History-May 26, 1990 pp. 1-10.

Primary Examiner—Allan D. Herrmann
Attorney, Agent, or Firm—Cumpston & Shaw

[57] ABSTRACT

An anti-backlash nut having a central bore therethrough, wherein a portion of the central bore is threaded to cooperatively engage a lead screw. A free floating insert is disposed in a radial aperture in the anti-backlash nut, such that a threaded inner surface of the insert contacts the lead screw. The threaded insert may be radially biased or offset such that the threads of the nut body and the threads of the insert engage opposing faces of the lead screw threads to provide accurate and reliable motion of the anti-backlash nut upon relative rotation of the lead screw.

23 Claims, 4 Drawing Sheets

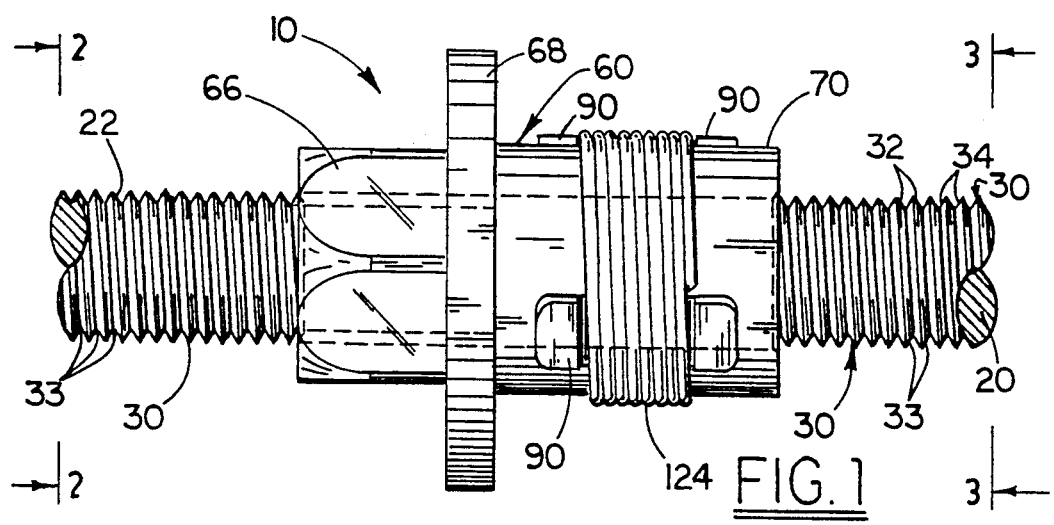
FIG.1
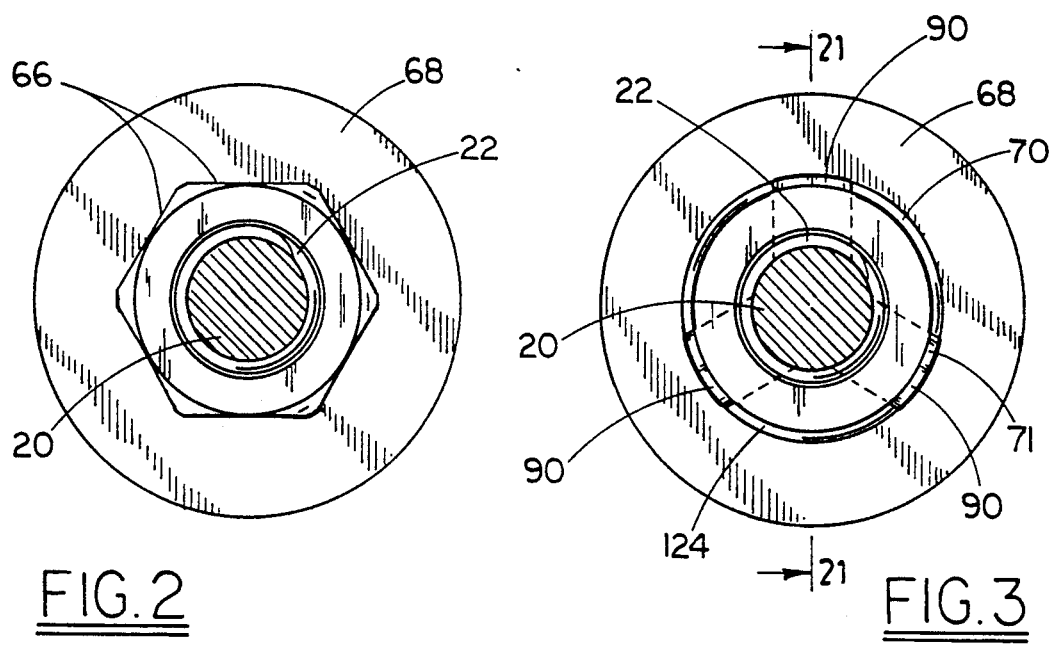
FIG.2
FIG.3
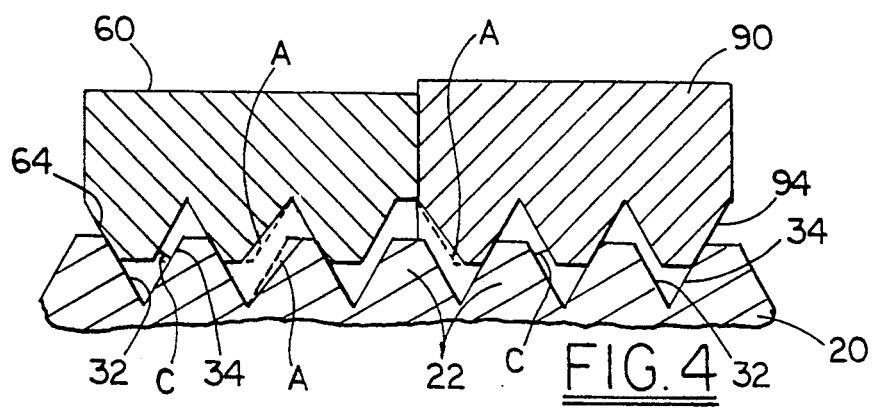
FIG.4

ANTI-BACKLASH NUT HAVING A FREE FLOATING INSERT FOR APPLYING AN AXIAL FORCE TO A LEAD SCREW

The present invention relates to anti-backlash nuts, and more particularly, to an anti-backlash nut having a radially movable free floating insert which is biased radially inward to engage a threaded inner surface of the insert with a lead screw.

BACKGROUND OF THE INVENTION

Rotating lead screws or threaded members are often used to locate a threaded element within a machine. In many applications, movement of the threaded element relative to the lead screw must be done accurately, repeatedly and with a relatively constant drag force in both a forward and reverse direction. Typical applications include data printers, x-y tables used as peripheral equipment in the computer industry, and loading mechanisms in copiers.

There have been many attempts to design anti-backlash nuts for meeting the tolerance requirements in precision equipment. A prior attempt is shown in U.S. Pat. No. 3,656,358 which discloses a linear positioning device having an improved collar. The collar is telescoped over and adapted to be translated relative to an elongate threaded rod. The collar includes cantilevered fingers resiliently wedged into spaced grooves to preload the collar onto the rod and prevent rotational play.

U.S. Pat. No. 3,997,269 discloses a self-aligning anti-backlash nut having a tubular nut body which co-acts with a concentric spring sleeves. Generally, the nut body includes a pair of spring biased elements provided with internal threads adapted to engage the external threads of a screw. In a preferred embodiment, a self-aligning spring sleeve has three pairs of oppositely disposed transverse slots to obtain the desired alignment characteristics. The nut body includes a base portion separated from the spring bias elements by two transverse slots which cooperate with an adjacent pair of slots in a spring sleeve to form a universal joint. A remaining slot pair in the sleeve is oriented circumferentially with respect to the first pair by an angle of 90° with a third pair of slots being circumferentially aligned with the first pair.

U.S. Pat. No. 4,249,426, (U.S. Pat. No. Re. 32,433) discloses an anti-backlash nut having one or more longitudinal flexural members with one end fixed and one end free floating. The flexural members include ramps on the free floating ends and an axially compressed spring is used to apply an axial force on the ramps and thereby create a radial force vector which maintains the ramps in contact with the threaded shaft.

However, each of the prior anti-backlash nuts provides a relatively small thread engagement area, approximately two to three threads, with the threaded lead screw. As the thread engagement area is limited, the rate of wear is accelerated. Therefore, almost any wear has a very detrimental effect on performance of the component. That is, many of the prior anti-backlash nuts have very little tolerance to wear.

Alternatively, anti-backlash nuts may be individually produced by creating precision threads. The precision threads identically match the threads of the lead screw to provide accurate tracking of the threaded member. However, the cost and quantity of precision thread manufacture is incompatible with the cost requirements of mass produced machines.

Therefore, a need exists for cost competitive anti-backlash nut having improved wear characteristics and tolerances. The need also exists for an anti-backlash nut having a size which is compatible with a variety of applications and which provides an increased thread engagement area between the anti-backlash nut and the threaded shaft. A further need exists for an anti-backlash nut which can be reliably mass produced without requiring extensive machining of the component parts.

SUMMARY OF THE INVENTION

The present invention provides an anti-backlash nut having an increased thread engagement area with a lead screw without increasing the operable size of the component. Specifically, the present invention includes a nut body having a central bore therethrough. Preferably, a portion of the central bore is threaded to cooperatively engage the lead screw. The nut body also includes a barrel portion having at least one radial aperture therein. A free floating insert having a threaded inner surface is disposed within the radial aperture to protrude into the central bore. The free floating insert is biased radially inward so that the threaded inner surface contacts the lead screw along substantially the entire length of the insert.

Preferably, the radial bias or offsetting of the start points of the insert threads and the nut body threads creates a clearance between the lead screw threads and the nut body and insert threads such that the insert threads contact one helical face of the lead screw threads and the nut body threads contact the remaining face of the lead screw threads.

The increased thread engagement area of the present invention increases the reliability of the anti-backlash nut. In addition, the enlarged thread engagement area reduces wear on individual threads and also minimizes the detrimental effect of wear on performance of the backlash nut, thereby increasing the tolerance to wear. Specifically, the large number of contacts between the insert and the lead screw ensures that upon any wear of the insert threads, a sufficient contact area remains to provide performance. Further, the free floating inserts provides substantially constant and uniform force on each of the threads contacting the lead screw. The balanced force along the entire length of the thread engagement area also reduces localized wear of the insert.

BRIEF DESCRIPTION OF THE DRAWINGS

FIG. 1 is a side elevational view showing the anti-backlash nut operably engaged with a threaded lead screw;

FIG. 2 is an elevational view taken along lines 2—2 of FIG. 1;

FIG. 3 is an elevational view taken along lines 3—3 of FIG. 1;

FIG. 4 is a schematic view showing the relative position of the nut body and the insert with respect to the lead screw upon operable engagement of the anti-backlash nut and the lead screw;

DETAILED DESCRIPTION OF THE PREFERRED EMBODIMENTS

Figure 21:
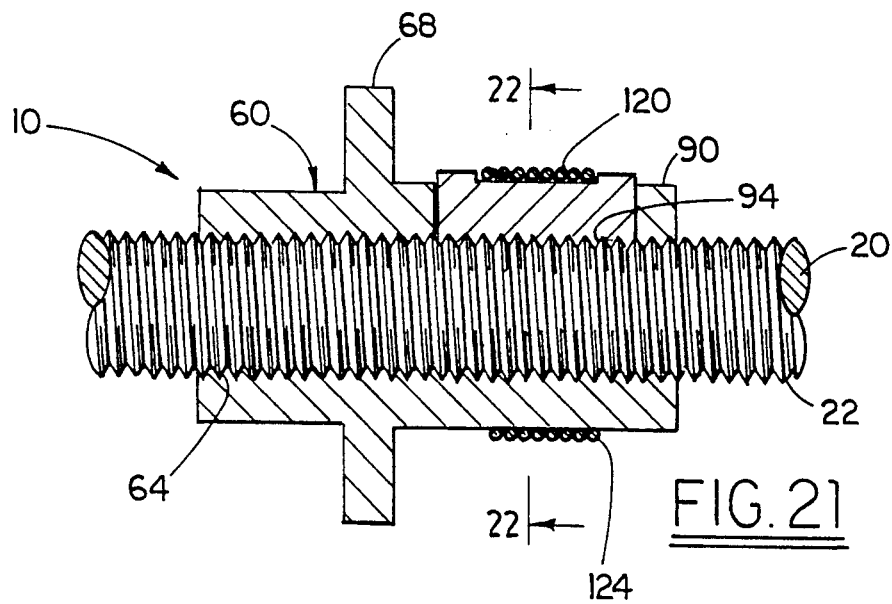
FIG. 21 is a cross sectional view taken along lines 21—21 of FIG. 3.
Figure 22:
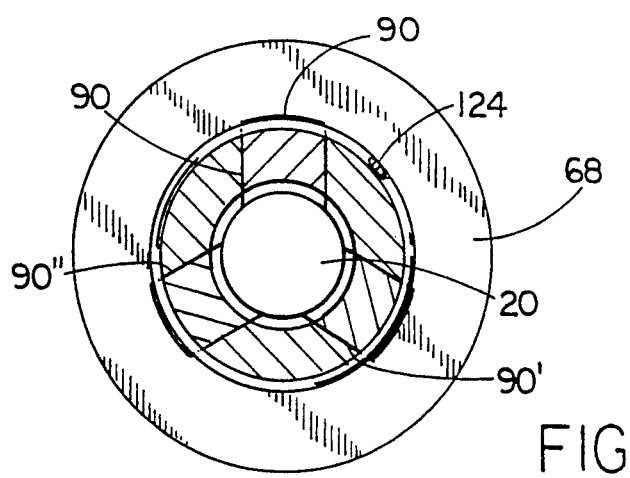
FIG. 22 is a cross sectional view taken along lines 22—22 of FIG. 21.

Referring to FIGS. 1 and 21, the anti-backlash nut 10 of the present invention includes a nut body 60, at least one free floating insert 90 and a bias mechanism 120. The anti-backlash nut 10 cooperatively engages a threaded lead or drive screw 20. The lead screw 20 may have one, two, three or four or more leads 22. The lead screw 20 includes threads 30 defined by a cross sectional profile of a first 32 and second 34 non parallel helical face which define a groove 33 therebetween. Therefore, the groove 33 between the threads 32, 34 on the lead screw 20 is defined by the converging non parallel helical faces. The major diameter of the threads 30 may be defined by the intersection of the helical faces 32, 34 or by the truncation of the intersection of the helical faces. The groove 33 may be partially defined by the truncation of the insertion of the converging non-parallel helical faces 32, 34. The specific thread characteristics are determined by design considerations of the operating environment.

As shown in FIGS. 1, 5-7 and 21, the nut body 60 is a substantially cylindrical member having a barrel portion 70 and a central bore 61 extending through the nut body. The central bore 61 is sized to receive the threaded lead, or drive screw 20. A length of the central bore 61 includes inwardly projecting primary threads 64 for cooperatively engaging the lead screw 70. In one embodiment of the invention, the primary threads 64 are defined by a symmetric thread cross section. That is, the threads and grooves are symmetrical about a helical curve. In an alternative embodiment, the primary threads may have an asymmetrical cross section.

The exterior of the nut body 60 may include wrench flats 66 and a peripheral face plate 68, such that the peripheral face plate is intermediate of the wrench flats and the barrel portion 70. The exterior is dictated by design considerations for the given application of the anti-backlash nut 10. Preferably, the length of the bore 61 corresponding to the wrench flats 66 and the face plate 68 includes the primary threads 64 to cooperatively engage the threads of the lead screw 20. Alternatively, the primary threads 64 may extend throughout the length of the bore 61, or any portion thereof.

Preferably, the barrel portion 70 includes at least one radial aperture 71 extending through the barrel portion to the central bore 61. In a preferred embodiment of the present invention, the barrel portion 70 includes three radial apertures 71, 71', 71" equally spaced 120° apart about the circumference of the nut 10. While the radial apertures 71, 71', 71" are shown at a common axial position, the radial apertures may be axially staggered or displaced.

The radial apertures 71, 71', 71" extend along an associated radius to perpendicularly intersect the central axis of the central bore 61. That is, the radial apertures are orthogonal to the longitudinal axis of the central bore 61. Alternatively, the radial apertures 71, 71', 71" may intersect the central bore obliquely. While the radial apertures 71, 71', 71" are shown having a rectangular cross section, the radial apertures may be defined by keyed slots, circular, polygonal or any other cross section.

Figure 5:
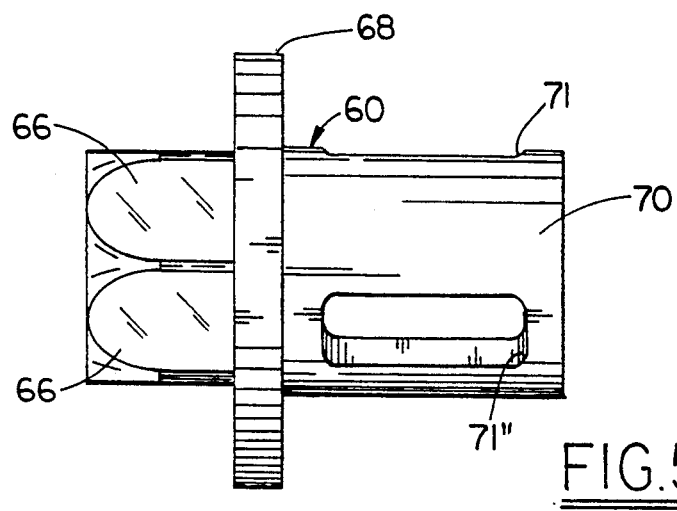
FIG. 5 is a side elevational view of the nut body.
Figure 6:
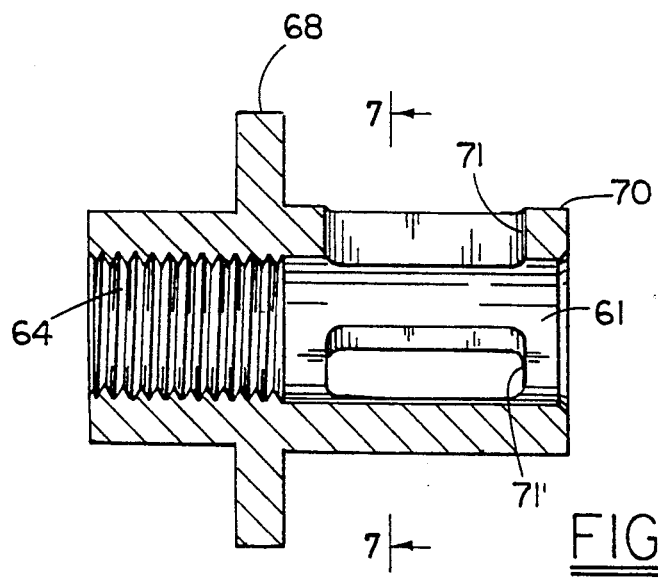
FIG. 6 is a side elevational cross sectional view of the nut body having primary threads extending along a portion of the nut body.
Figure 7:
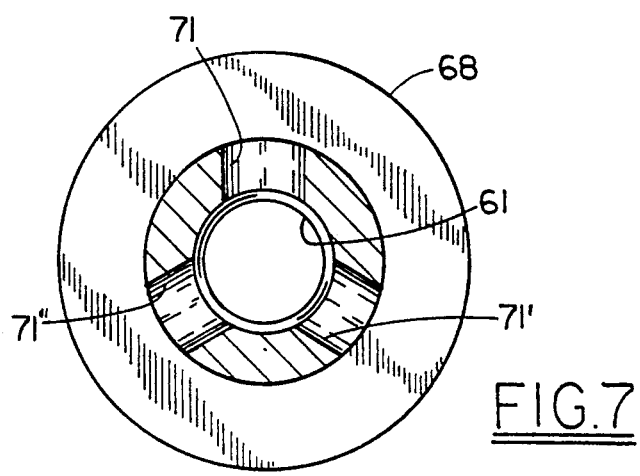
FIG. 7 is a cross sectional view taken along lines 7—7 of FIG. 6.
Figure 8:
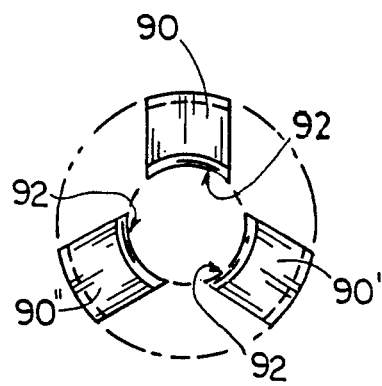
FIG. 8 is an end view showing the relative location of the inserts.
Figure 9:
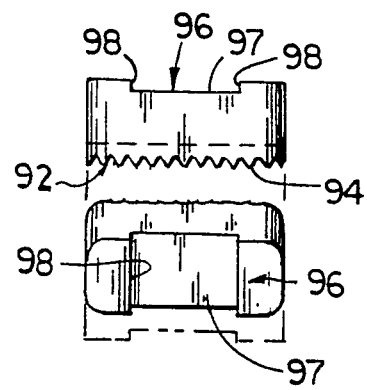
FIG. 9 is a side elevational view showing the relative position of the inserts.
Figure 10:
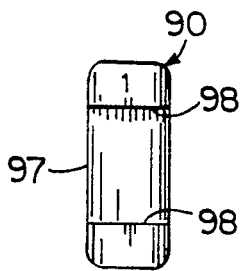
FIG. 10 is a top plan view of a first insert.
Figure 13:
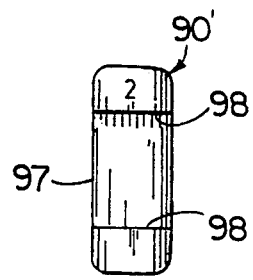
FIG. 13 is a top plan view of a second insert.
Figure 16:
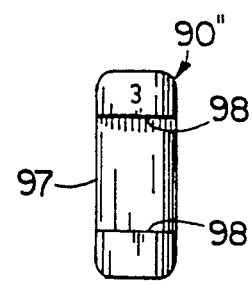
FIG. 16 is a top plan view of the third insert.
Figure 11:
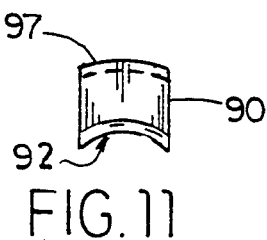
FIG. 11 is a end elevational view of the insert of FIG. 10.
Figure 14:
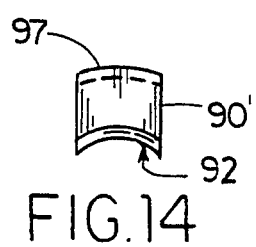
FIG. 14 is a end elevational view of the insert of FIG. 13.
Figure 17:
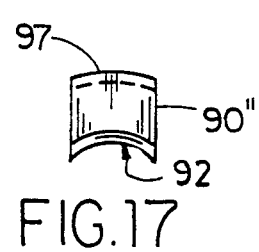
FIG. 17 is an end elevational view of the insert of FIG. 16.
Figure 12:
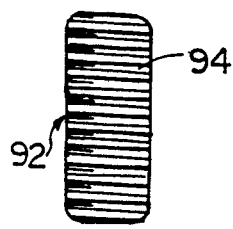
FIG. 12 is a bottom elevational view of the insert of FIG. 10.
Figure 15:
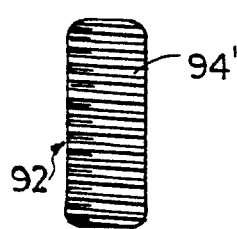
FIG. 15 is a bottom plan view of the insert of FIG. 13.
Figure 18:
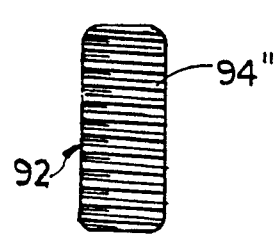
FIG. 18 is a bottom plan view of the insert of FIG. 16.
Figure 19:
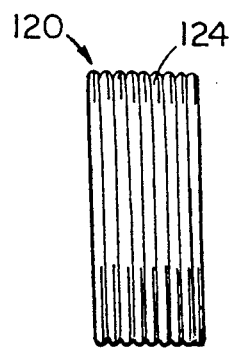
FIG. 19 is a side elevational view of the torsion spring.
Figure 20:
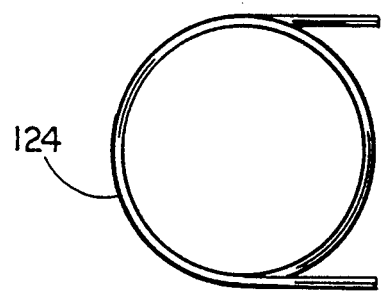
FIG. 20 is an end elevational view of the torsion spring.

As shown in FIG. 6, the length of the bore 61 corresponding to the barrel portion 70 is not threaded. However, referring to FIG. 21, the anti-backlash nut 10 may be manufactured to include primary threads 64 throughout substantially the entire length of the central bore 61. The radial apertures 71, 71', 71" extend through the primary threads 64 of the nut body 60 such that the corresponding inserts 90, 90', 90" pass into the central bore 61 through the primary threads of the nut body.

The nut body 60 is formed of a thermoplastic such as acetyl based thermoplastic having 10% to 15% Teflon filled acetyl. However, other materials known in the art having self lubricating properties may be employed. The nut body is formed by injection molding.

A free floating insert 90, 90', 90" is disposed in a corresponding radial aperture 71, 71', 71". For the purpose of the description, the inserts will be treated as interchangeable, as will the radial apertures. However, it must be understood that the radial apertures and the inserts may be uniquely associated rather than interchangeable.

The insert 90 has a threaded inner surface 92 exposed to the central bore 61 and an outer surface 96 which may extend slightly beyond the periphery of the barrel portion 70. The inner surface 92 includes secondary threads 94 for cooperatively engaging the lead screw 20. The secondary threads 94 may be defined by symmetric pitch diameters. That is, the threads 94 and corresponding grooves are defined by a symmetrical cross section along a helical curve. In an alternative embodiment, the secondary threads 94 and the corresponding grooves may be defined by an asymmetrical cross section. The outer surface 96 of the insert 90 includes a recess 97 laterally bounded by shoulders 98. The recess extends along at least half the length of the insert. In either configuration, the threaded inner surface of the insert 90 preferably has at least approximately 8-10 thread portions for contacting the lead screw 20.

The insert 90 has a periphery (cross section) which is compatible to the periphery of the radial aperture 71 to permit the insert to be radially displaced relative to the radial aperture. That is, the insert for a circular radial aperture has a circular cross section. While the insert 90 is received within the corresponding radial aperture 71, the tolerance between the insert and the aperture is sufficiently minimized to substantially preclude travel of the insert relative to the nut body or the lead screw. Preferably, the insert to radial aperture tolerance is sufficiently small so that motion of the insert 90 relative to the nut body 60 in the axial or lateral direction is substantially precluded. That is, any motion of the insert 90 relative to the nut body 60 introduces backlash into the nut. The inserts are formed of a thermoplastic such as acetyl based thermoplastic having 10% to 15% Teflon filled acetyl and is formed by injection molding. Alternatively, the inserts may be formed of any material having self lubricating properties such as pure Teflon.

The bias or resistance mechanism 120 urges the inserts 90 inward to intersect the central bore 61 and contact the lead screw 20. The bias mechanism 120 may be a torsion spring wound around the barrel portion 70 of the nut body 60 to engage the outer surface 96 of the inserts 90. Preferably, a torsion spring 124 forms the resilient member and contacts the recess 97 of the inserts 90 between the shoulders 98 to operably engage the inserts. The torsion spring 124 urges the inserts 90 radially inward into the central bore 61. The torsion spring 124 may be formed of approximately 15 turns of 0.020 music wire. However, the bias mechanism 120 for urging the free floating inserts 90 radially inward may be any of a variety of resilient members such as leaf springs, coil springs and an axially load acting upon a ramp to translate into a radial force vector.

The configuration of the inserts 90 and cooperation with the bias mechanism 120 provide a substantially uniform bias along all the secondary threads 94, so that none of the secondary threads is subject to a substantially greater force than the remaining secondary threads. The resistance mechanism 120 acts over a substantial portion of the length of the insert 90, and preferably the radial bias acts over at least one-half the axial length of the insert.

The present anti-backlash nut 10, may cooperate with any single, double, or higher lead threads on the lead screw so long as the primary 64 and the secondary threads 94 are formed with a corresponding thread lead or a corresponding configured thread lead.

Referring to FIG. 4, upon operable assembly of the anti-backlash nut 10, a clearance C is formed between the primary threads 64 and the lead screw 20, as well as between the secondary threads 94 and the lead screw. The clearance C between the primary threads 64 and the lead screw 20 provides that the contact between the primary threads and the lead screw is on one helical plane of the lead screw threads 22. As shown schematically in FIG. 4, the primary threads 64 of the nut body 60 engage only the left side of the cross section of the lead screw threads 22.

Similarly, there is clearance C between the secondary threads 94 of the inserts 90 and the lead screw threads 22. The clearance C between the secondary threads 94 and the lead screw 20 provides contact of the secondary threads and the lead screw along only one face of the lead screw. The contact between the secondary threads 94 and the lead screw 20 is along the helical plane which opposes the contact between the primary threads 64 and the lead screw. Therefore, the primary threads 64 operatively contact only the first helical face of the lead screw threads and the secondary threads 94 operatively contact only the second helical face of the lead screw threads. For purposes of description, the operable engagement of the primary 64 and secondary threads 94 on only opposing helical faces of the lead screw threads is referred to as "clearance."

Clearance between the threads of the anti-backlash nut 10 and the lead screw 20 may be formed in part or in total, by manipulation of one or both of the primary 64 and secondary thread 94 configurations. For example, offsetting the start point of the secondary threads 94 from the start point of the primary threads 64 creates clearance C between the lead screw threads 22 and the primary and/or secondary threads. Offset of the start points defines the necessary rotation of the lead screw 20 to operably engage both the secondary threads 94 and the primary threads 64. For example, a 128° offset requires the lead screw to rotate 128° after engaging the primary threads 64 before the secondary threads 94 are engaged. The offset causes the primary 64 and the secondary threads 94 to partially climb out of the groove in the lead screw 20 to form the clearance C upon operable engagement with the lead screw. As the primary threads 64 climb along the lead screw threads 22, the primary threads contact one helical face of the lead screw threads. Simultaneously, the secondary threads 94 climb partially out of the groove in the lead screw 20 and contact the opposing helical face from the primary thread 64. Therefore, upon rotation of the lead screw 20 in either direction, one of the primary threads 64 and the secondary threads 94 is immediately in operable contact with the lead screw threads 22.

The preferred offset in a double lead screw thread having a pitch of 1.5 mm, and for a maximum torque of 6 inch oz., is approximately 128°.

Alternatively, clearance between the primary 64 and secondary threads 94 and the lead screw threads 22 may be formed by an asymmetrical primary 64 and/or secondary threads 94. While either the primary 64 or the secondary threads 94 may be asymmetrical, only the secondary threads 94 will be described in detail, with the understanding that the same teachings may be applied to the primary threads.

Referring to FIG. 4, asymmetry A lies in the reduction of one side of the cross sectional profile defining the secondary threads 94. As one side is reduced, clearance C is formed which causes the remaining side to contact a single helical face of the lead screw threads. Upon operable contact of one side of the secondary threads 94 with the lead screw threads 22, the radially inward bias on the insert 90 causes the insert to urge the nut body 60 in a direction away from the helical face which is contacting the secondary threads. This longitudinal force causes the primary threads 64 to climb partially out of the grooves in the lead screw 20 and contact only the helical face which opposes the helical face contacting the secondary threads 94.

While the extent of asymmetrical formation depends upon the performance requirements of the anti-backlash nut, the primary 64 or secondary threads 94 may be formed with a 0.0013 in. reduction along one helical face of the threads.

Finally, the clearance C may be formed by a combination of offsetting the thread starts of the primary 64 and secondary threads 94 and asymmetry of the primary and/or secondary threads. Again, depending upon the necessary performance characteristics, one of the primary 64 and the secondary threads 94 may have an asymmetry of approximately 0.00065 in. and the offset between the primary and the secondary threads may be approximately 64°. These specific values are for purposes of illustration and do limit the available range of offset and asymmetry that may be used with free floating inserts 90 to achieve anti-backlash characteristics.

Independent of the structure which forms the clearance C between the anti-backlash nut 10 and the lead screw 20, as shown schematically in FIG. 4, the torsion spring 120 axially loads the anti-backlash nut onto the lead screw. That is, the primary threads 64 of the nut body 60 engage one set of parallel surfaces of the threads of the lead screw 20, while the secondary threads 94 contact the opposing helical face of the lead screw threads 22. Therefore, upon rotation of the lead screw 20 drive shaft in either direction contact with the anti-backlash nut is instantaneous upon rotation of the shaft.

The torque necessary to rotate the anti-backlash nut 10 relative to the lead screw 20 is a function of the offset and the force exerted by the bias mechanism 120. Specifically, the greater the compressive force on the inserts 90, the greater the torque necessary to rotate the anti-backlash nut 10. Generally, the less the secondary threads 94 are offset from the primary threads 94, the greater the necessary radial force on the inserts 90. Alternatively, the more the secondary threads 94 are offset, the more clearance created and the less force required by the bias mechanism 120, thereby reducing the torque necessary to rotate the nut 10. Therefore, a desired torque may be achieved by selecting a given offset and a given radial force by the bias mechanism. In addition, the number of leads on the lead screw also effects the torque characteristics of the anti-backlash nut 10.

Although the present embodiment is described in terms of three free floating inserts 90, the present anti-backlash nut 10 may be employed with one, two, three, or four or more free floating inserts. The inserts 90 may be equally spaced about the circumference of the nut 10, or may be staggered about both the circumference and the longitudinal axis of the nut. Further, the primary 64 and secondary threads 94 may be configured to cooperatively engage a lead screw having a high helix of more than two leads with pitches from .thousandths of an inch per revolution to 2 inches per revolution. In fact, the present invention can be employed with helix, wentworth, buttress, American class, UNC, UNF, Acme thread forms from pitches of approximately 0.001 to over two inches, wherein the thread forms may have one, two or more leads. While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. An anti-backlash nut for movement along a threaded screw, comprising:
   (a) a nut body adapted to receive a length of the screw, the nut body including at least two radial apertures;
   (b) an insert slideably received in each of the radial apertures, each insert having a threaded surface for operably engaging a length of the threaded screw; and
   (c) a resilient member for urging the inserts radially inward to operably engage the inserts with the length of the screw.

2. The anti-backlash nut of claim 1, wherein the nut body includes primary threads to cooperatively engage a portion of the threaded screw.

3. The anti-backlash nut of claim 1, wherein the radial apertures are perpendicular to the threaded screw.

4. The anti-backlash nut of claim 2, wherein a starting point of the threaded insert is rotationally offset from a starting point of the primary threads to create a clearance between a portion of the threaded insert and the threaded screw.

5. The anti-backlash nut of claim 2, wherein the resilient member exerts a sufficient radial bias upon the inserts to create a clearance between the threaded insert and the threaded screw.

6. An anti-backlash nut designed to move along a threaded screw in either of two longitudinal directions, comprising:
   (a) a nut body adapted to receive a length of the screw, the nut body including a radial aperture extending perpendicular to the longitudinal directions;
   (b) an insert slideably received in the aperture; and
   (c) a resistance member for applying a force on the insert to engage the insert with a plurality of threads of the screw.

7. The anti-backlash nut of claim 6, wherein the resistant member is a coil spring having an inner diameter which is less than an outer diameter of the nut body adjacent the radial aperture.

8. An anti-backlash nut for movement along a threaded screw in either of two longitudinal directions, comprising:
   (a) a nut body having an axial bore therethrough to receive a length of the screw, wherein a length of the bore is threaded to cooperatively engage the screw, the nut body including at least one radial aperture;
   (b) an insert having a threaded inner surface slideably received in the radial aperture such that the threaded inner surface is exposed to the axial bore; and
   (c) a biasing member for applying a force on the insert to operably engage the threaded inner surface with a portion of the screw to form a clearance between the threaded screw and one of the threaded bore and the threaded inner surface, the clearance formed by one of rotationally offsetting a start point of the threaded bore and the threaded inner surface, and an asymmetrical cross section in one of the threaded screw, the threaded bore and the threaded inner surface.

9. The anti-backlash nut of claim 8, wherein the biasing member exerts a sufficient radial bias upon the insert to create a clearance between the threaded inner surface and the threaded screw.

10. An anti-backlash nut for movement along a threaded screw in either of two longitudinal directions, the threaded screw having a thread profile substantially defined by first and second non parallel helical faces, the nut comprising:
   (a) a nut body having an axial bore therethrough to receive a length of the screw, wherein a length of the bore includes primary threads sized to cooperatively engage the first helical face of the threaded screw, the nut body including a radial aperture;
   (b) an insert received within the aperture, the insert having an inner surface which includes secondary threads for cooperatively engaging the second helical face of the threaded screw; and
   (c) a bias member for urging the insert inward to contact the primary threads with the first helical face and to contact the secondary threads with the second helical face to form a clearance between one of the first and second helical faces and one of the primary and secondary threads, the clearance formed by one of rotationally offsetting a start point of the primary threads and the secondary threads, and an asymmetrical cross section in one of the threaded screw, the primary threads and the secondary threads.

11. The anti backlash nut of claim 10, wherein the primary threads contact only the first helical face and the secondary threads contact only the secondary helical face.

12. The anti backlash nut of claim 11, wherein the primary threads are defined by a symmetrical cross section.

13. The anti backlash nut of claim 11, wherein the primary threads are defined by an asymmetrical cross section.

14. The anti backlash nut of claim 11, wherein the secondary threads are defined by a symmetrical cross section.

15. The anti backlash nut of claim 11, wherein the secondary threads are defined by an asymmetrical cross section.

16. The anti backlash nut of claim 11, wherein the start point of the secondary threads is rotationally offset from the start point of the primary threads.

17. The anti backlash nut of claim 16, wherein the start point of the secondary threads is rotationally offset from the start point of the primary threads by less than 100°.

18. An anti-backlash nut for movement along a threaded screw, comprising:
(a) a nut body having an axial bore therethrough, the axial bore including a threaded length for receiving a length of the threaded screw, the nut body having a radial cavity open to the axial bore; and
(b) an insert slideably received in the cavity, the insert having a threaded surface exposed to the axial bore for engaging a portion of the threaded screw to form clearance between the threaded screw and a portion of one of the threaded length and the threaded surface by one of rotationally offsetting a start point of the threaded length and the threaded surface, and forming one of the threaded screw, the threaded length and the threaded surface to have an asymmetrical cross section.

19. A method for translating an anti-backlash nut along a threaded screw in either of two longitudinal directions, the threaded screw having a thread profile substantially defined by first and second non parallel helical faces, the method comprising:
(a) operably engaging primary threads of a nut body with the first helical face of the threaded screw threads;
(b) disposing an insert in a radial aperture in the nut body for radial movement relative to the nut body; and
(c) operably engaging secondary threads of the insert with the second helical face of the threaded screw threads to form clearance between the threaded screw and a portion of one of the primary threads and the secondary threads by one of rotationally offsetting a start point of the primary threads and the secondary threads, and forming one of the thread profile, the primary threads and the secondary threads to have an asymmetrical cross section.

20. The method of claim 19, further comprising biasing the insert radially inward.

21. A method of manufacturing an anti-backlash nut for cooperatively engaging a threaded lead screw, comprising:
(a) forming a nut body having a central bore with a threaded portion for cooperatively engaging a length of the lead screw and a radial aperture intersecting the central bore;
(b) disposing an insert in the radial aperture such that a threaded portion of the insert cooperatively engages a portion of the lead screw; and
(c) creating a clearance between the lead screw and one of the nut body and the insert by one of rotationally offsetting a start point of the threaded bore and the threaded portion, and forming one of the lead screw, the threaded bore and the threaded portion to have a cross section to create the clearance.

22. The method of claim 21 further comprising urging the radial insert against the lead screw.

23. A method for translating an anti-backlash nut along a threaded screw, the anti-backlash nut including a nut body having a threaded bore for receiving a length of the threaded screw the nut body including a radial cavity, and an insert slideably received in the cavity, the insert having a threaded surface for engaging the threaded screw, the method comprising:
(a) rotationally offsetting a start point of the threaded bore and the threaded surface.

* * * * *